May 16, 1967     E. J. STENGLE, JR     3,319,662

SPIRALLY WOUND CONTAINER

Filed Jan. 2, 1964

INVENTOR.
EDWARD J. STENGLE JR.
BY Philip M. Rice
    W. A. Schaich
ATTORNEYS

United States Patent Office 3,319,662
Patented May 16, 1967

1

3,319,662
SPIRALLY WOUND CONTAINER
Edward James Stengle, Jr., Toledo, Ohio, assignor to Owens-Illinois, Inc., a corporation of Ohio
Filed Jan. 2, 1964, Ser. No. 335,114
14 Claims. (Cl. 138—154)

This invention relates generally to spirally wound containers wherein a plurality of plies of elongated sheet materials are wound spirally to form a cylindrical tube which is subsequently used as the body portion in forming such containers. More particularly, this invention relates to a new and novel seam which improves the axially compressive strength of such spirally wound container over that of a similar container formed with a standard seam as is well known in the art.

Spirally wound containers, particularly those formed of a lamination of fiber sheet material and aluminum foil or plastic film, are coming into increasingly greater use for the packaging of goods. Such containers, upon filling with a product, are normally stored on end (i.e., with the longitudinal axis in a vertical position) with many additional containers or other objects frequently being stacked on top. Such stacking results in the containers, particularly the lower ones, being subjected to a great axially compressive force. It is obviously essential that the containers be capable of withstanding such compressive forces.

Accordingly, it is an object of the present invention to provide a spirally wound container capable of withstanding a high degree of axially compressive force.

Most failures of spirally wound containers resulting from excessive axially compressive forces occur along the seam. In large measure, the reason for such failure is due to the fact that the container, by its very configuration, tends to permit the mating edges forming the spiral seam to slip relative to one another. This is especially true where the main structural ply of the container is formed with a butt joint rather than a lap joint.

Accordingly, it is an additional object of this invention to provide a container spiral seam capable of withstanding a high degree of axially compressive force without separation occurring between the mating edges forming such seam.

Other objects and advantages of the present invention will become readily apparent from the following detailed description taken in conjunction with the annexed sheet of drawings on which:

Figure 1:
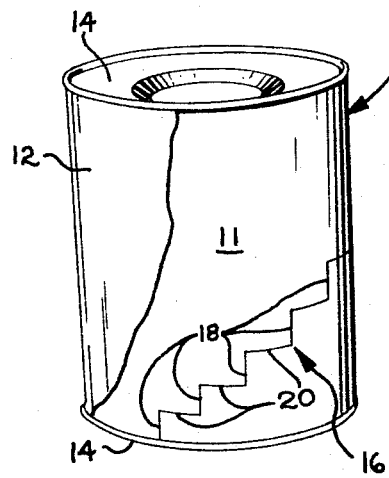
FIGURE 1 is a perspective view of a container formed according to the present invention.

In brief, the present invention provides a spirally wound container in which the seam of at least one of the plies, preferably the heaviest ply, is formed with a generally stair-step configuration.

Referring now to the drawings, there is provided a container having a cylindrical body portion generally designated 10 and a pair of discs 14 crimped to the ends thereof. The body portion 10 is formed by spirally winding any desired number of plies around a mandrel to form a spirally wound tube which is subsequently cut into length and used as the body portion in forming the container. For example, the body portion typically may include an inner ply (not shown) of a thin film of plastic or metal foil, a heavier ply 11 of fiber board and an outer label ply 12. Such construction is cited merely for the purpose of illustration and not limitation as many variations in construction are well known in the art. Various methods of spirally winding sheet material to form a cylindrical tube are also known to those skilled in the art. A description of one such method may be had by reference to United States Patent No. 2,218,116.

Figure 2:
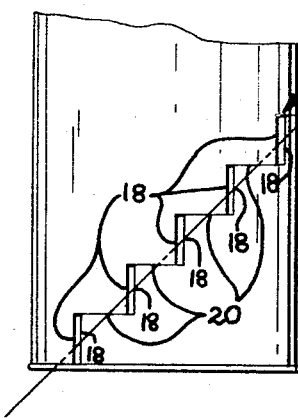
FIGURE 2 is a fragmentary elevational view of a container formed according to another embodiment of the present invention.

Under the present invention, the edges of the sheet material used for forming at least one of the plies of the spirally wound container, preferably the heavier ply 11, are formed with a stair-step configuration. When the sheet material is spirally wound, opposite edges of the ply or plies having the stair-step edge configuration, the heavier ply 11 in FIGURE 1, are brought into abutting relationship to form a line of juncture generally designated 16. Such line of juncture follows a generally spiral path around the container which is disposed at an angle relative to the container ends known as the angle of wind. Such angle of wind is illustrated in FIGURE 2 by the numeral 30. Under the embodiment illustrated in FIGURE 1, the line of juncture 16 comprises a plurality of segments 18 which are parallel to the longitudinal axis of the body portion 10 and a plurality of segments 20 lying in planes perpendicular to the longitudinal axis of the container. The segments 20 which lie in planes perpendicular to said longitudinal axis are substantially horizontal when the lower end is resting upon a horizontal surface and the container longitudinal axis is vertical. As a result, when articles are stacked upon the upper end, the axially compressive force imparted thereby will tend to urge the abutting edges of the sheet material forming the horizontal segments 20 of the line of juncture into tighter engagement. This is in contrast to the conventional seam having abutting edges following directly on the angle of wind 30 in which an axially compressive force tends to cause one edge to slip relative to the other. Thus, it can be readily seen that such stair-step seam configuration results in a container capable of withstanding relatively high axially compressive forces.

In its broader aspects, it is within the contemplation of the present invention to provide a container in which the edges forming the horizontal segments 20 but not necessarily the edges forming vertical segments 18 are in abutment. A container so formed is illustrated in FIGURE 2. Thus, in the spiral winding of the ply or plies having edges with the above-referenced, stair-step configuration, it is relatively simple to achieve abutment of one set of segments but a higher degree of control is necessary to achieve abutment of both sets. It is quite apparent that a small gap between the respective vertical segments 18 will have no substantial effect in reducing the axially compressive strength of the container.

Figure 3:
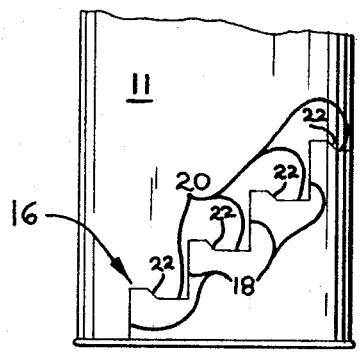

Referring now to FIGURE 3, there is shown another embodiment in which the abutting edges are formed with a configuration which will give an interlocking effect to the seam formed thereby. Thus, the line of juncture includes a segment 22 tapered at a downwardly directed angle. This configuration provides interlocking which prevents the tube from unwinding unless the upper abutting edge is first moved upwardly relative to the lower abutting edge. This interlocking, in addition to giving the container increased strength in axial compression also gives a bracing effect to the container body, providing it with great resistance to any forces, axial or lateral, tending to unwind tubular body.

Figure 4:
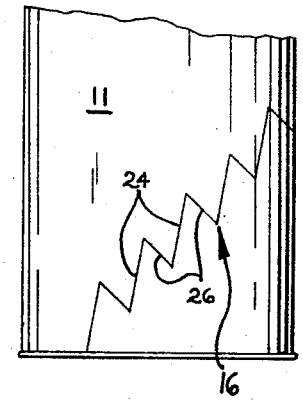
FIGURES 3 and 4 are views similar to FIGURE 2 showing additional embodiments.

Referring to FIGURE 4, there is illustrated an additional embodiment in which the line of juncture 16 includes segments 24 and 26, neither of which is either parallel to the longitudinal axis of the body portion 10 nor lies in a plane which is perpendicular to such axis. In other words, assuming that the container is resting on one end so that its longitudinal axis is vertical, is is not necessary that the line of juncture 16 have either a horizontal or a vertical component. The only critical requirement is that, in following the line of juncture 16 from the lower edge of the body portion 10 toward the top, there is either a horizontally or a downwardly directed component.

Although the line of juncture 16 has been described as having straight line segments 18 and 20 or 24 and 26 joined to form relatively sharp corners, it should be understood that such corners could be rounded. Also, if desired, the entire length of the line of juncture could follow a series of reverse curves. The critical requirement in that case is that in following the line of juncture from the lower edge of a vertically aligned body portion 10 to the top, there be a curve segment the tangent for which is either horizontally or downwardly directed. As used herein and in the appended claims, the term "stair-step configuration" shall be understood to include a series of reverse curves as well as a series of straight line segments or a combination of curves and straight line segments.

It should be understood from the foregoing description that many other edge configurations forming widely varying lines of juncture 16 are fully within contemplation of the present invention. While the present invention was described with the heavy ply only being formed with a stair-step seam configuration, it obviously is not so limited as any of the plies could be so formed.

It will be readily apparent to those skilled in the art that the present invention provides a container which will withstand greatly increased axial strength to the container utlizing the same. It is obvious that many changes and modifications may be made in this invention without departing from its spirit and scope which is to be limited only by the following claims.

I claim:

1. In a tubular structure formed of spirally wound sheet material, the improvement comprising the edges of said sheet material arranged so as to provide a butt seam, the adjacent edges forming said seam correspondingly shaped so as to provide a stair-step seam arranged to prevent slippage between said adjacent edges.

2. In a tubular structure formed of spirally wound sheet material, the improvement comprising the edges of said material arranged so as to provide a butt seam, the adjacent edges forming said seam correspondingly shaped so as to provide a stair-step seam formed by joined intermittent segments, the included angle between adjacent intermittent segments being not greater than 90 degrees.

3. In a tubular structure formed of spirally wound sheet material, the improvement comprising the edges of said material arranged so as to provide a butt seam, the adjacent edges of said seam correspondingly shaped so as to provide a stair-step seam formed by joined segments, a portion of which are directed away from the axial direction of said seam.

4. In a tubular structure formed of spirally wound sheet material, the improvement comprising the edges of said material arranged so as to provide a butt seam, the adjacent edges of said seam correspondingly shaped so as to provide a stair-step seam formed by joined segments, a portion of which are directed normal to or away from the axial direction of said seam.

5. In a tubular structure formed of spirally wound sheet material and aligned with its longitudinal axis in a vertical position, the improvement comprising the edges of said material arranged so as to provide a butt seam, the adjacent edges forming said seam correspondingly shaped so as to provide a stair-step seam formed by joined segments a portion of which, in following the seam from bottom to top of the vertically aligned structure, are disposed in a generally downwardly direction.

6. In a tubular structure formed of spirally wound sheet material and aligned with its longitudinal axis in a vertical position, the improvement comprising the edges of said material arranged so as to provide a butt seam, the adjacent edges forming said seam correspondingly shaped so as to provide a stair-step seam formed by joined segments a portion of which, in following the seam bottom to top of the vertically aligned structure, are disposed in a horizontally or in a generally downwardly direction.

7. In a tubular structure formed of spirally wound sheet material and aligned with its longitudinal axis in a vertical position, the improvement comprising the edges of said material arranged so as to provide a butt seam, the adjacent edges forming said seam correspondingly shaped so as to provide a stair-step seam formed by joined segments a portion of which lie in a horizontal plane.

8. A tubular structure having a seam comprising spirally wound sheet material the adjacent edges of which have similar stair-step configurations in mating engagement forming a generally spirally disposed line of juncture having a plurality of joined segments, a portion of which are directed normal to or away from the axial direction of said spirally disposed line of juncture.

9. A tubular structure having a seam comprising spirally wound sheet material the opposite longitudinal edges of which have similar stair-step configurations, said edges being matingly engaged to form a generally spiral line of juncture having a plurality of joined segments so disposed that said line of juncture from the bottom to the top of said structure, when vertically aligned, includes segments which are horizontally or downwardly directed.

10. A tubular structure having a seam comprising sheet material spirally wound so that opposed edges thereof are abuttingly engaged to form a generally spirally disposed line of juncture, said edges having similar stair-step configurations such that the line of juncture formed by said abutting edges, followed from the bottom to the top of said structure, when vertically aligned, includes at least one horizontally or downwardly disposed segment.

11. In a tubular structure formed of sheet material spirally wound about a longitudinal axis, the improvement comprising the edges of said sheet material arranged to provide a butt seam, the edges forming said seam correspondingly shaped so as to provide a stair-step seam which includes abutting edge lying in a plane perpendicular to said longitudinal axis.

12. In a tubular structure formed by spirally winding sheet material, an improved butt seam formed by bringing opposite edges of said sheet material into mating engagement, said opposite edges having corresponding stair-step configurations such that the line of juncture formed by said matingly engaged edges, followed from bottom to top of said structure when axially vertically aligned includes at least one horizontal segment.

13. In a tubular structure formed by spirally winding sheet material, an improved butt seam formed by bringing opposite edges of said sheet material into mating engagement, said opposite edges having corresponding stair-step configurations such that the line of juncture formed by said matingly engaged edges, followed from bottom to top of said structure when axially vertically aligned includes at least one segment generally downwardly directed.

14. In a tubular structure formed by spirally winding sheet material about a longitudinal axis, an improved butt seam formed by bringing opposite edges of said sheet material into mating engagement, said opposite edges having corresponding stair-step configurations such that the line of juncture formed by said matingly engaged edges, followed from bottom to top of said structure when axially vertically aligned includes at least one segment which, if projected, would reach a plane normal to said longitudinal axis passing through the bottom of said seam.

References Cited by the Examiner

UNITED STATES PATENTS

| | | | |
|---|---|---|---|
| 2,218,116 | 10/1940 | Magill | 229—4.5 X |
| 2,515,365 | 7/1950 | Zublin | 138—154 X |

FOREIGN PATENTS 131,134  1/1949  Australia.

LAVERNE D. GEIGER, *Primary Examiner.*

T. L. MOORHEAD, *Assistant Examiner.*